United States Patent Office 3,718,585
Patented Feb. 27, 1973

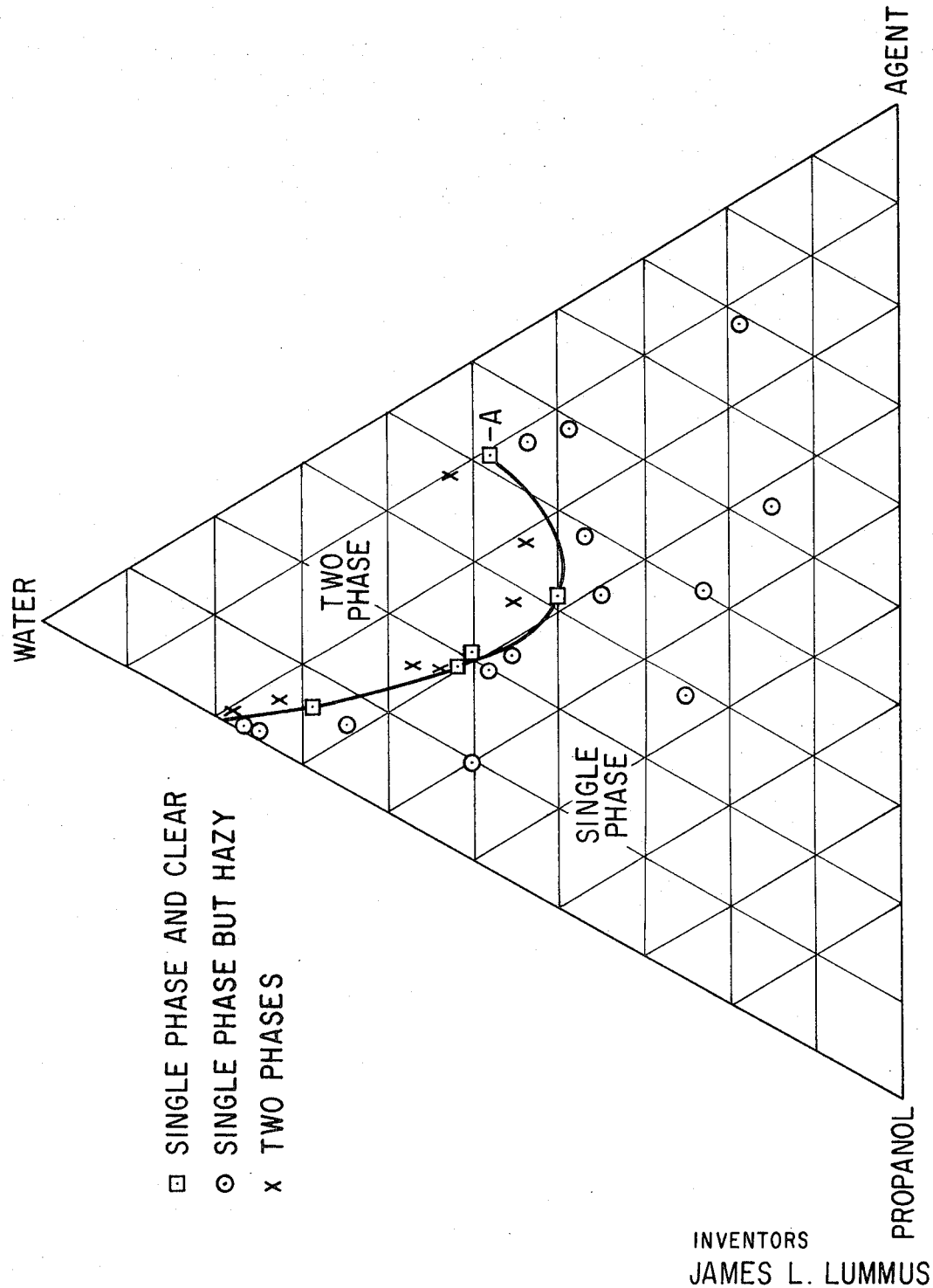

3,718,585
STABILIZING ASPHALT IN WATER-BASE
DRILLING FLUIDS
James L. Lummus and Duane B. Anderson, Tulsa, and
Carl D. Edwards, Broken Arrow, Okla., assignors to
Amoco Production Company, Tulsa, Okla.
Filed Aug. 2, 1971, Ser. No. 168,303
Int. Cl. C10m 3/14, 3/08
U.S. Cl. 252—8.5 C
10 Claims

ABSTRACT OF THE DISCLOSURE

The action of an agent for causing solid particles of asphalt to enter into and form a stable suspension in water-base drilling fluid is improved by prehydrating the agent and dissolving the prehydrated agent in normal propanol and water before use. The asphalt-stabilizing agent may be a limited class of ethoxylated alkyl phenols or ethoxylated polypropylene glycols. The monobutyl ether of ethylene glycol or of diethylene glycol can be used in place of normal propanol.

---

It has been previously disclosed that certain ethoxylated alkyl phenols and ethoxylated polypropylene glycols are unusually effective stabilizing agents for solid particles of asphalts and asphalt-like materials, such as gilsonite, in water-base drilling fluids. It has also been noted that these agents are even more effective if used in a kerosene solution. See, for example, U.S. patent application Ser. No. 778,813, filed on Nov. 25, 1968, now abandoned by J. L. Lummus and C. D. Edwards. The two classes of asphalt-stabilizing agents are (1) the reaction product of from about 3 to 6 and preferably from about 4 to 5 moles of ethylene oxide with 1 mole of an alkyl phenol in which the alkyl group contains from about 8 to about 12 and preferably about 9 carbon atoms, and (2) the reaction product of from about 8 to about 13 and preferably about 10 percent by weight of ethylene oxide with from about 87 to about 92 and preferably about 90 percent by weight of polypropylene glycol having a molecular weight between about 1700 and about 3500, and preferably about 2200. When the term "asphalt-stabilizing agent" is used herein, a member of these classes is intended.

These agents were originally called stabilizing agents because they prevented separation of ingredients, including asphalts, from a water-base substantially clay-free drilling fluid. In the case of the ground asphalt particles, the agents apparently form a water-wettable coating on each individual asphalt particle so these particles become individually distributed and maintained throughout the aqueous phase. The term "stabilizing agent" is used herein not only in the sense of maintaining the particles in the aqueous phase once they are in this phase, but of actively putting them into the aqueous phase in the beginning. The term seems applicable whether the aqueous drilling fluid is substantially clay-free or is clay-base since the agents are effective in stabilizing asphalts, gilsonite, and the like, in all aqueous drilling fluids.

These stabilizing agents are liquids. When they are added in undiluted form to water, they do not dissolve. Instead of remaining in the form of liquid droplets, however, the materials hydrate and become gummy semi-solids which coagulate into particles of various shape with maximum dimensions up to about 1/10 inch. The ethoxylated alkyl phenols are worse in this regard than the ethoxylated polypropylene glycols. It will be apparent that such large particles are hardly the best form for treating the surfaces of finely ground asphaltic solids such as gilsonite. This probably explains the improved action of the kerosene solution. These solutions simply cause the formation of smaller hydrated particles. Even with kerosene solutions, it has been found that localized high concentrations in drilling fluid can cause gilsonite to ball up. A possible explanation is that a large amount of hydrated stabilizing agent is thrown out of the kerosene solution and sticks the gilsonite particles together.

With these problems in mind, an object of the invention is to provide a method and composition for stabilizing asphalt in water-base muds, the method and composition avoiding the difficulties which occur when the additive hydrates in the water-base fluid. Another object is to provide an aqueous drilling fluid containing well stabilized solid particles of asphalt. Still other objects will be apparent from the following description and claims.

SUMMARY OF THE INVENTION

We have found that the hydration difficulties can be avoided and very greatly improved results can be obtained by prehydrating the asphalt stabilizing agent and introducing this prehydrated agent into the drilling fluid in the form of a solution in a solvent for the prehydrated agent. In order to insure effective prehydration of the agent, as much water as possible should be used as part of the solvent. The volume of water should be at least as great as the volume of any other solvent or solvents used. The prehydrated stabilizing agent has turned out to be an unusual material so that only three solvents have been found which meet the solubility requirements together with requirements on flashpoint to avoid fire hazards. These solvents are normal propanol, the monobutyl ether of ethylene glycol, and the monobutyl ether of diethylene glycol. The last two agents are commonly referred to by the trademarks "butyl Cellosolve" and "butyl Carbitol." These trademarks will usually be employed hereinafter for convenience since the chemical names are rather long. By use of the solutions of prehydrated agents, the effectiveness is so greatly increased that the concentration can be reduced to less than 1/10 the minimum thought possible on the basis of the unhydrated, undiluted agent.

The drawing shows the unusual phase relationships between one of the stabilizing agents with one of the solvents and water.

There are many potential solvents for the prehydrated asphalt stabilizing agents. These include the esters, ketones, amines, ethers, alcohols, polyols, aromatic liquids, and the like. Many of these, such as acetone, methyl formate, phenol, methanol, isopropanol, diethanol amine, ethylene glycol, and the like, are relatively low in cost compared to other solvents. They are the ones which would normally be expected to be used. It turns out, however, that none of these inexpensive materials are satisfactory. Some, such as phenol, were too insoluble in water to act as suitable solvents for the prehydrated agents and water. Some, such as ethylene glycol and diethanol amine, turned out to be too hydrophilic to dissolve the relatively hydrophobic asphalt stabilizing agents with or without water present. Others, such as diethylene glycol, methyl formate, methyl Cellosolve (monomethyl ether of ethylene glycol), hexyl Carbitol (monohexyl ether of diethylene glycol), 1,4-dioxane, and the like, are sufficiently good solvents for the stabilizing agents to form clear water-free solutions. When a 20 percent solution of the agent in these solvents is diluted with an equal volume of water to hydrate the agent, however, the solution separates into two phases. Thus, these solvents do not seem to be sufficiently good solvents for the hydrated agent. It is important that a single phase solution be used since the solution should be shipped in fairly large contaners, usually about 5 gallons, and is used in very small amounts. Thus, first one phase and then the other of a two-phase system in such containers would be used with resulting non-uniform performance.

Many of the better solvents are too low-boiling and present a fire hazard. Included in this group are methanol, acetone, methyl formate, ethanol, diisopropyl amine, isopropanol, methyl ethyl ketone, tertiary butanol, ethyl acetate, and the like.

Some solvents suffer from two or more defects. For example, methyl ethyl ketone, diisopropyl amine and ethyl acetate not only present fire hazards, but are also too water-insoluble. Isopropanol is not only too low-boiling, but also causes foaming in most drilling fluids.

An effort was made to control the volatility of low-boiling solvents by adding a small amount of high-boiling solvent. In this work, methanol was used as the principal solvent. The solvent properties of methanol are not as good as some materials, but the cost of methanol is so low compared to solvents other than petroleum fractions that an effort to use the solvent seemed advisable. In this work, an initial solution was made containing 10 percent by weight of ethoxylated nonyl phenol having about 4 moles of ethylene oxide per mole of nonyl phenol. The solution also contained 40 percent by weight of water and 50 percent by weight of methanol. The results of adding 5 grams of various liquids to 45 grams of this solution are shown in Table I. In all these tests, flashpoints were determined by the open-cup method, ASTM designation D-1310.

TABLE I

| Test No. | Added solvent | Flashpoint, °F. |
|---|---|---|
| 1 | None | 68 |
| 2 | n-Propyl alcohol | 61 |
| 3 | n-Butyl alcohol | 54 |
| 4 | Water | 55 |
| 5 | Ethylene glycol | 59 |
| 6 | Methylene chloride | 55 |

This table is presented to show the unpredictability in this field. The high-boiling solvents in every case lowered the flashpoint instead of raising it. The explanation of this unexpected behavior is not known.

An investigation of some less common and more expensive solvents finally discovered three solvents which might be suitable with prehydrated exthoxylated nonyl phenol. Results of solubility tests of these materials, together with tests of a few of the more obvious solvents, are presented in Table II. In all the tests, the asphalt stabilizing agent was ethoxylated nonyl phenol containing about 4 moles of ethylene oxide per mole of nonyl phenol. In every case, the amount of stabilizing agent was 2.5 milliliters and the amount of solvent was 10 milliliters. The ethoxylated nonyl phenol was first dissolved in the solvent and then water was added.

TABLE II

| Test No. | Solvent | Water, ml. | Remarks |
|---|---|---|---|
| 1 | Ethylene glycol | 0 | Separated. |
| 2 | do | 12.5 | Do. |
| 3 | Diethylene glycol | 0 | Clear. |
| 4 | do | 12.5 | Separated. |
| 5 | 1,4-dioxane | 0 | Clear. |
| 6 | do | 12.5 | Separated. |
| 7 | Diethanol amine | 0 | Do. |
| 8 | do | 12.5 | Do. |
| 9 | Methyl Cellosolve [a] | 0 | Clear. |
| 10 | do | 12.5 | Separated. |
| 11 | Butyl Cellosolve [b] | 0 | Clear. |
| 12 | do | 12.5 | Do. |
| 13 | Butyl Carbitol [c] | 0 | Do. |
| 14 | do | 12.5 | Do. |
| 15 | Hexyl Carbitol [d] | 0 | Do. |
| 16 | do | 12.5 | Separated. |
| 17 | n-Propanol | 0 | Clear. |
| 18 | do | 12.5 | Do. |

[a] Trademark for monomethyl ether of ethylene glycol.
[b] Trademark for monobutyl ether of ethylene glycol.
[c] Trademark for monobutyl ether of diethylene glycol.
[d] Trademark for monohexyl ether of diethylene glycol.

As previously noted, two of the inexpensive solvents which should have been useful, ethylene glycol and diethanol amine, did not prove to be good solvents for ethoxylated nonyl phenol, even in the absence of water. Others, such as diethylene glycol and methyl Cellosolve, formed clear solutions with the asphalt stabilizing agent but these solutions, when diluted with water, separated into two phases. Thus, although these liquids are good solvents for both the ethoxylated nonyl phenol and water separately, they are not sufficiently good solvents for a mixture of the water and the asphalt stabilizing agent. The same was obviously also true for the dioxane and hexyl Carbitol. The reason for failure of these solvents to dissolve mixtures of the stabilizing agent and water is not known, but is presumed to be due to hydration of the agent by the water.

As previously noted, only 3 rather randomly distributed solvents seemed to be satisfactory. These were normal propanol, the monobutyl ether of ethylene glycol and the monobutyl ether of diethylene glycol. Efforts were made to decrease the amounts of these 3 successful solvents and increase the amount of water. Results are reported in Table III.

TABLE III

| Test No. | Agent amount, ml. | Solvents Material | Amount, ml. | Water, ml. | Remarks |
|---|---|---|---|---|---|
| 1 | 2.5 | Butyl Cellosolve | 5 | 7.5 | Cloudy. |
| 2 | 2.5 | do | 5 | 17.5 | Do. |
| 3 | 2.5 | do | 7.5 | 10.0 | Clear. |
| 4 | 2.5 | do | 7.5 | 15.0 | Separated. |
| 5 | 2.5 | Butyl Carbitol | 5.0 | 7.5 | Clear. |
| 6 | 2.5 | do | 5.0 | 12.5 | Do. |
| 7 | 2.5 | do | 5.0 | 17.5 | Cloudy. |
| 8 | 2.5 | do | 7.3 | 15.0 | Clear. |
| 9 | 2.5 | do | 7.3 | 20.0 | Do. |
| 10 | 2.5 | do | 6.5 | 16.0 | Do. |
| 11 | 2.5 | do | 6.5 | 21.0 | Blue haze. |
| 12 | 2.5 | n-Propanol | 5.6 | 16.9 | Separated. |
| 13 | 2.5 | do | 6.2 | 16.3 | Cloudy. |
| 14 | 2.5 | do | 7.5 | 10.0 | Clear. |
| 15 | 2.5 | do | 7.1 | 17.2 | Do. |

The data in Table III show that butyl Carbitol and normal propanol are slightly better solvents than butyl Cellosolve. Tests 10 and 15 show that 10 percent solutions of the stabilizing agent can be prepared containing over 60 percent water. The composition of Test 15 has been made commercially available and is now in successful field use. In preparing the composition, the ingredients are weighed rather than the amounts being measured by volume. The formula by weight and by volume is presented in Table IV.

TABLE IV

| Ingredient | Percent by weight | Percent by volume |
|---|---|---|
| Ethoxylated nonyl phenol | 10.0 | 9.3 |
| Normal propanol | 22.5 | 26.7 |
| Water | 67.5 | 64.0 |
| Total | 100.0 | 100.0 |

The percentages are different principally due to the low density of the normal propanol. Normal propanol is preferred since it is somewhat less expensive than butyl Carbitol. The commercial formula has a flashpoint of 99° F.

Most of the tests in Table III were directed to preparation of a solution containing 10 percent by volume of the asphalt stabilizing agent. It has been found that only very small amounts of the prehydrated diluted form of the agent are required in drilling fluids. In order to improve the ease and accuracy of measuring these small amounts, it may sometimes be desirable to add the agent as a solution containing as little as 2 percent or even less by volume of the agent. In Table II, tests are presented which determined the maximum amount of water and minimum amount of alcohol required for preparing 10 percent solutions. Similar tests were run for other concentrations of asphalt stabilizing agent. The results are presented in the drawing.

From the curve in the drawing, it will be observed that there is no simple relationship between the amount of alcohol required and the amount of stabilizing agent or water. The relationship is apparently quite complex and unpredictable and must be determined empirically. The values are, of course, somewhat different for various alkyl groups on the phenol and for various amounts of ethylene oxide in the final ethoxylated alkyl phenol. They are also somewhat different for ethoxylated polypropylene glycols than for ethoxylated alkyl phenols.

The composition identified as point "A" on the drawing deserves special comment. This composition was slightly hazy as were others plotted as squares rather than circles or crosses. This one was unique, however, since it was a gel. Compositions containing a little less water were single-phase and liquid. Those containing a little more water were two-phase and liquid. The borderline composition "A," however, was a rather thin gelatinous material somewhat like the pastey solid which forms when the undiluted agent is added directly to water but much less viscous. This is probably due to the high concentrations of agent and water and the low normal propanol content. The exact mechanism is not known. The effect can be avoided by use of lower concentrations of the agent. As previously noted, even a 10 percent concentration may be considered too high for many purposes. The preferred range is from about 2 to about 20 percent, which is far below the concentration at which gels formed.

Most of the work reported to this point was with ethoxylated nonyl phenol. A solution of the other class of asphalt stabilizing agent, the ethoxylated polypropylene glycol, was prepared. The solvent was normal propanol and water. The polypropylene glycol had a molecular weight of about 2200 before ethoxylation. The amount of ethylene oxide was about 10 percent of the weight of the final product.

The alcohol solution contained 10 percent by volume of the ethoxylated polypropylene glycol, 40 percent by volume of normal propanol and 50 percent by volume of water. The solution was clear at temperatures below about 78° F. but cloudy at temperatures much above this point. This temperature sensitivity is characteristic of borderline compositions. It shows that a little more alcohol should be used. Obviously, a little more alcohol is required to dissolve the ethoxylated polypropylene glycol than is required for the ethoxylated nonyl phenol. Solutions formed using butyl Cellosolve instead of normal propanol confirmed this observation.

When reference is made herein to an alcohol suitable for my purposes, one selected from the group consisting of normal propanol, the monobutyl ether of ethylene glycol and the monobutyl ether of diethylene glycol is intended.

When reference is made to "asphalt," the term is intended broadly to include not only asphalt obtained from crude oil, but other asphaltic minerals sometimes referred to as "asphaltites." These include such materials as elaterite, manjac, glance pitch, grahamite, gilsonite, and the like. Gilsonite is preferred because of its low cost, ready availability, and apparent good quality control. The asphalt should have a softening point of at least about 250° F. and, for most purposes, should be ground to pass a No. 80 sieve, and preferably finer. However, at least about 90 percent should be retained on a No. 325 U.S. standard sieve. Some of the particles can, of course, be retained on a No. 80 sieve but these will be less effective for most purposes. More than 10 percent passing a No. 325 sieve can also be used under some circumstances. Asphalts having softening points below 250° F. can be used at lower temperatures as long as the softening point is above the temperatures of use.

Coarse particles of gilsonite are sometimes used for lost circulation control. These may contain some particles big enough to be retained on a No. 4 U.S. standard sieve. Ordinarily, there is little difficulty in mixing these large particles into water or drilling fluid. Nevertheless, it will be apparent that my stabilizing agent solution can be used to aid in preparing aqueous slurries of such large particles, if desired. However, the solution is intended principally for use with the much more finely ground solid particles of asphalt and is used with much greater advantage with these finely ground materials.

Referring back to the inverse temperature effect, that is, the increased solubility at lower temperatures, this is thought to be due to hydration of the oxyethylene chain of the ethoxylated nonyl phenol or polypropylene glycol. The hydration increases at lower temperatures and decreases at higher temperatures. Improved solubility at lower temperatures may be due simply to more water being tied up as water of hydration leaving less free water to dilute the alcohol. The improved solubility may also be due to an increased alcohol solubility of the more highly hydrated material. Whatever the theory, the phenomenon eliminates any low-temperature solubility problems. The tendency of water to hydrate the oxyethylene chain possibily explains some of the unexpected solubility behavior of the ethoxylated asphalt stabilizing agents in the presence of some solvents and water.

Even the undiluted ethoxylated nonyl phenol is unusually effective in giving a stable suspension of asphalt in water or aqueous drilling fluids. The action of kerosene solutions is more spectacular. If finely ground gilsonite is placed on water, the gilsonite continues to float in spite of its density being higher than that of water. The reason is that the water does not wet the surfaces of the particles. If a little kerosene solution of the asphalt stabilizing agent is added, the kerosene spreads over the water surface to the gilsonite. As the solution touches the gilsonite, the gilsonite spreads almost explosively over the surface and slowly sinks into the water as the surfaces of the particles become water-wet in spite of the presence of the kerosene. The action of the alcohol solution is not as spectacular in one way, in that the gilsonite does not explosively spread on the surface. It is more spectacular in another way, however, since the gilsonite very rapidly becomes water-wet and sinks into the water as separate individual particles. When dilute alcohol solutions of the prehydrated agents are used, the action is so effective that little agitation is required.

The asphalt stabilizing agent was first developed for a substantially clay-free aqueous drilling fluid in which the usual functions of clay in the drilling fluid, plus a few other functions, were performed by flaxseed gum (usually in the form of flaxseed meal), asbestos and asphalt (usually gilsonite). This is still one of the more important applications of the stabilizer in a solution of its prehydrated form. This clay-free drilling fluid is described in more detail in U.S. patent application S.N. 778,813, previously mentioned.

This substantially clay-free drilling fluid was designed to provide the properties of clay-base drilling fluid without using clay. In field use of the clay-free system, it has been found that some of the properties and practices which are important in clay-base muds are not very important in the clay-free drilling fluid. For example, it has been found that the usual API filtrate rate measurement ordinarily has little significance in the clay-free mud. It is thought that a low filtrate rate to the formation is important and that this is provided by the drilling fluid, but that the present API filtrate test simply does not give an accurate measure of the loss of filtrate from this particular composition to the actual formations.

It has also been found that providing certain concentrations of flaxseed meal and gilsonite in the drilling fluid are not as important as providing a certain weight of these ingredients per foot of well drilled. The function of these agents seems to be to provide an adequate protective coat on the exposed surfaces of the well bore. This function is more closely related to the number of feet drilled than to the concentration maintained in the drilling fluid. It is now common practice to add a given number of pounds of each material per 100 feet drilled, rather than a certain number of pounds per barrel of drilling fluid or per day. Thus, the practice frequently is to add about 1 to 10 and preferably about 2 to 5 pounds of flaxseed meal and about an equal amount of gilsonite per foot of drilled hole. The amounts of flaxseed meal and gilsonite can be expressed in other terms, however. For example, the described quantities usually amount to around two or three 50-pound sacks of each additive every 8-hour tour depending on the drilling rate. In terms of concentration in pounds per barrel, these treatment rates ordinarily provide from about 0.05 to about 1.0 pound per barrel maintained in the mud.

If a well is drilled to a depth of a few thousand feet before treatment with flaxseed meal and gilsonite begins, an initial treatment with something like 30 sacks (1500 pounds) of each additive is usually made in a mud system of about 600 or 700 barrels. This is to coat the exposed walls of the well drilled without the additive. Then, treatment at the reduced suggested above is started. This heavy initial treatment may amount to as much as 2 or 3 pounds per barrel each of flaxseed meal and gilsonite.

As previously noted, the asphalt stabilizing agent is much more effective as an alcohol solution of its prehydrated form. One of the most surprising aspects of the alcohol solutions is the very low concentrations in which they can be used. In early work with the asphalt stabilizing agents, they were used in undiluted form. Laboratory work indicated a minimum concentration of at least about 0.05 pound per barrel of drilling fluid should be used. By prehydrating the agent and using it as a dilute solution of this prehydrated agent in one of the 3 alcohols, concentrations considerably less than a 1/10 of that previously thought possible have been successfully used.

It has been observed that the agent is usually present in the drilling fluid as a film on the surfaces of solid asphaltic particles. Thus, a less conventional but perhaps more significant figure might be pounds of agent per pound of asphalt rather than pounds of agent per barrel of drilling fluid. The concentration can be expressed in both ways. In general, it has been found that as little as a gallon of the 10 percent alcohol solution of prehydrated agent (about 8 pounds) for about 400 pounds (8 sacks) of gilsonite will stabilize gilsonite in almost all aqueous drilling fluids. Even less of the solution, for example, a gallon for 800 pounds of gilsonite, can be used in many cases. This is about 0.01 pound of solution or 0.001 pound of the agent itself per pound of gilsonite.

As noted above, the flaxseed meal and gilsonite treatments in the substantially clay-free drilling fluid generally provide from about 0.05 to about 1 pound per barrel of each ingredient in the drilling fluid. Obviously, use of 0.001 pound of stabilizing agent per pound of gilsonite means the concentration of agent can be as low as 0.00005 pound per barrel of drilling fluid. As a practical matter, it is difficult to add so little, so the usual concentration is in the range from about 0.002 to about 0.01 pound per barrel. As much as 0.05 pound or even more per barrel does no harm and may be used. This may amount to as much as about 0.1 pound of agent per pound of gilsonite. Obviously, what was previously thought to be the bare minimum concentration of the agent has become a generous maximum for the dilute alcohol solution of the prehydrated material. It should be noted that these values are for the substantially clay-free drilling fluid. Other values are used for clay-base drilling fluids. These are given below.

When concentrations of the agent are given herein, these concentrations are based on the unhydrated form of the material. This seems necessary since the degree of hydration is not known and varies with the temperature and probably with other conditions.

In the substantially clay-free drilling fluid, addition of asbestos has also varied from the usual practice of maintaining a certain concentration continuously in the drilling fluid. The most common recent practice seems to be to add little, if any, asbestos between trips to change the bit and then add from about 5 to about 20 sacks and preferably about 10 sacks (about 500 pounds) to only a portion of the circulated mud stream to build up a high concentration in a small volume to sweep the hole clean of bit cuttings just before a trip. Thus, the concentration of asbestos in certain portions of the mud system may be as much as 4 or 5 pounds per barrel. After the asbestos has been mixed throughout the entire system and much of it has been lost from the system before the next addition, the concentration may drop as low as about 0.2 pound per barrel. Under some circumstances, as in deep wells or during fast drilling, it has been found advisable to add about 5 sacks of asbestos (about 250 pounds) every 8 hours between the heavy treatments before trips. These hourly treatments avoid an excessively low concentration in the mud with consequent buildup of too many bit cuttings in the well.

The other ingredients of the substantially clay-free mud may include oil, salt, and a preservative, such as paraformaldehyde, for the flaxseed meal. The amount of oil may still be from zero to about 20 percent by volume as originally recommended, although usually none at all is now used. The amount of salt may vary from zero to saturation, although most usage has been in drilling fluids containing a rather high salt content. The amount of preservative can usually be zero in the drilling fluid if much salt is present. However, a little preservative, about ½ pound in a 50-pound sack, is usually added to the ground flaxseed meal in the sacks to preserve it until it reaches the drilling fluid. This preservative, of course, finds its way into the drilling fluid with the flaxseed meal and provides a very low concentration of preservative in the drilling fluid. In fresh water systems, it is advisable to introduce additional preservative to provide a concentration of about 0.1 pound per barrel. In all cases where a barrel is specified, one having a volume of 42 U.S. gallons is intended.

In summary, the substantially clay-free drilling fluid can be said to contain water and the ingredients listed in Table V.

TABLE V

| Ingredient: | Concentration, lb./bbl. |
|---|---|
| Flaxseed meal | 0.05 to 3.0. |
| Ground gilsonite | Do. |
| Ground asbestos | 0.2 to 5.0. |
| Preservative for flaxseed meal | 0 to 0.1. |
| Oil | 0 to 20*. |
| Water-soluble salt | 0 to saturation. |
| Stabilizing agent | 0.0005 to 0.05. |

*Percent by volume rather than pounds per barrel.

While the asphalt stabilizing agent was first developed in connection with the substantially clay-free aqueous drilling fluid, its greatest use seems to have been in connection with clay-base aqueous drilling fluid. When gilsonite or other solid asphaltic materials are added to clay-base systems, they are generally used in somewhat higher concentrations than in the clay-free mud just described. The gilsonite concentration is most often in the range from about 2 to about 5 pounds per barrel of drilling fluid. In such cases, use of about 0.001 pound of the stabilizing agent per pound of asphalt results in concentrations of from about 0.002 to about 0.005 pound of stabilizing agent per barrel of drilling fluid.

One of the most common reasons for using gilsonite in clay-base drilling fluids is to provide some of the lubricating action of oil while avoiding the use of oil. In some areas, however, disposal of an oil-containing drilling fluid is no problem, so oil may be used. It is still desirable to use gilsonite in such muds to stabilize the well walls. The alcohol solution of prehydrated asphalt stabilizing agent is very effective in such muds containing both oil and gilsonite.

When adding asphalt and its stabilizing agent to an aqueous drilling fluid, many methods of addition are possible. It has been found best, however, to add the asphalt through a mud hopper like most other ground solid drilling fluid additives. The prehydrated stabilizing agent solution is then added as a small stream to the mud pit at the point where the mud hopper discharge stream enters the pit. Some drillers prefer to add the agent to the mud in the pit first and then discharge the mud hopper effluent into this pit. If some floating of ground gilsonite occurs, a little stabilizing agent solution can be sprinkled over the mud in the pit or added in other ways and the pit agitated slightly to cause the gilsonite to enter and become stabilized in the mud.

It is also possible to use the alcohol and water solution to precoat the asphalt particles. For example, gilsonite soaked in the alcohol and water solution of Table IV and then dried at low temperature is easily mixed into water. The alcohol and water solution can also be used to form a slurry of gilsonite in wate after which the slurry can be filtered and dried. It is then easily reintroduced into water. Many variations will be apparent to those skilled in the art.

Two limitations should be mentioned. The precoating technique cannot be performed with kerosene solutions. The kerosene remains associated with the gilsonite particles to coat them and stick them together so they are not readily mixed into water as individual particles. The other limitation is high temperature. If a thick coating of stabilizing agent is deposited on gilsonite particles, this thick coating tends to stick the particles together at a temperature of about 150° F. For this reason, the coating should be kept thin, and drying temperatures as well as storage temperatures for the precoated gilsonite should be kept below this temperature and preferably below about 100° F.

Only the normal propanol solution has been used in field operations. In the laboratory, however, solutions in normal propanol, butyl Cellosolve, and butyl Carbitol have substantially identical effects in asphalt-stabilizing, foaming, and the like. Particularly in salt water there is some foaming action, but this has not proved to be a problem in field use. Foam depressants, such as tributyl phosphate, can be used, if desired or necessary.

From the foregoing description, it will be apparent that we have overcome the hydration troubles of the asphalt-stabilizing agents by prehydrating the agents and using them in an alcohol solvent for the prehydrated materials. Effectivness is improved so much that the concentration can be reduced to less than 1/10 the minimum previously thought possible. This solution to the hydration problem has been complicated by the peculiar solubility characteristics of the prehydrated agents. Only three suitable solvents have been found among the hundreds which might be thought to be usable. With this one limitation, several alternates and variations will be apparent to those skilled in the art. Therefore, we do not wish to be limited to the examples described above, but only by the following claims.

We claim:

1. In a method for causing solid asphalt particles to disperse into a water-base drilling fluid and stabilizing the resulting suspension, in which method an asphalt-stabilizing agent is used to cause the asphalt to disperse into the drilling fluid, the asphalt-stabilizing agent being selected from the group consisting of (1) the reaction product of from about 3 to about 6 moles of ethylene oxide with one mole of an alkyl phenol in which the alkyl group contains from about 8 to about 12 carbon atoms, and (2) the reaction product of from about 8 to about 13 percent by weight of ethylene oxide with from about 87 to about 92 percent by weight of a polypropylene glycol having a molecular weight between about 1700 and about 3500, wherein said stabilizing agent hydrates tending to become gummy semi-solids which coagulate into particles, the improvement comprising preventing such coagulation by first dissolving said asphalt-stabilizing agent in an aqueous solvent and thereafter adding the resulting solution to the asphalt containing drilling fluid in an amount corresponding to from about 0.001 to about 0.1 pound of said agent per pound of asphalt, the solvent in said solution being water and an alcohol selected from the group consisting of normal propanol, the monobutyl ether of ethylene glycol, and the monobutyl ether of diethylene glycol, the volume of water in said solution, including water of hydration, ranging from about 60 percent to about 80 percent by volume.

2. The method of claim 1 in which said asphalt is gilsonite, said alcohol is normal propanol, said stabilizing agent is ethoxylated nonyl phenol containing from about 4 to about 5 moles of ethylene oxide per mole of nonyl phenol, and the concentration of said stabilizing agent in said solution is from about 2 to about 20 percent by volume.

3. The method of claim 1 in which said asphalt is ground so that it passes a No. 80 U.S. standard sieve and at least about 90 percent is retained on a No. 325 U.S. standard sieve.

4. The method of claim 3 in which said asphalt is gilsonite and said solution has about the following formula:

| Ingredient: | Percent by volume |
|---|---|
| Ethoxylated nonyl phenol | 9.3 |
| Normal propanol | 26.7 |
| Water | 64.0 | said ethoxylated nonyl phenol containing about 4 moles of ethylene oxide per mole of nonyl phenol.

5. The method of claim 1 in which said aqueous drilling fluid has the composition consisting essentially of water and the following ingredients:

Flaxseed meal: 0.05 to 3.0 pounds per barrel
Ground asphalt: 0.05 to 3.0 pounds per barrel
Ground asbestos: 0.2 to 5.0 pounds per barrel
Preservative for flaxseed meal: 0 to 0.1 pound per barrel
Oil: 0 to 20 percent by volume
Water-soluble salt: 0 to saturation
Stabilizing agent: 0.0005 to 0.05 pound per barrel.

6. An aqueous drilling fluid consisting essentially of solid particles of asphalt stabilized in said drilling fluid by use of a stabilizing agent selected from the group consisting of (1) the reaction product of from about 3 to about 6 moles of ethylene oxide with one mole of an alkyl phenol in which the alkyl group contains from about 8 to about 12 carbon atoms, and (2) the reaction product of from about 8 to about 13 percent by weight of ethylene oxide with from about 87 to about 92 percent by weight of a polypropylene glycol having a molecular weight between about 1700 and about 3500, said stabilizing agent being added to said drilling fluid in prehydrated form as a solution in water and alcohol in an amount corresponding to from about 0.001 to about 0.1 pound of said agent per pound of asphalt, said alcohol being selected fro mthe group consisting of normal propanol, the monobutyl ether of ethylene glycol and the monobutyl ether of diethylene glycol, and the volume of water in said solution ranging from about 60 percent to about 80 percent by volume.

7. The drilling fluid of claim 6 in which said asphalt is gilsonite, said alcohol is normal propanol, said stabilizing agent is ethoxylated nonyl phenol containing from about 4 to about 5 moles of ethylene oxide per mole of nonyl phenol, and the concentration of said stabilizing agent in said solution is from about 2 to about 20 percent by volume.

8. The drilling fluid of claim 6 in which said aqueous drilling fluid has the composition consisting essentially of water in and the following ingredients:

Flaxseed meal: 0.5 to 3.0 pounds per barrel
Ground asphalt: 0.05 to 3.0 pounds per barrel
Ground asbestos: 0.2 to 5.0 pounds per barrel
Preservative for flaxseed meal: 0 to 0.1 pounds per barrel
Oil: 0 to 20 percent by volume
Water-soluble salt: 0 to saturation
Stabilizing agent: 0.0005 to 0.05 pound per barrel.

9. The drilling fluid of claim 6 in which said asphalt is ground so that is passes a No. 80 U.S. standard sieve and at least about 90 percent is retained on a No. 325 U.S. standard sieve.

10. The drilling fluid of claim 9 in which said asphalt is gilsonite and said solution has about the following formula:

| Ingredient: | Percent by volume |
|---|---|
| Ethoxylated nonyl phenol | 9.3 |
| Normal propanol | 26.7 |
| Water | 64.0 | said ethoxylated nonyl phenol containing about 4 moles of ethylene oxide per mole of nonyl phenol.

References Cited

UNITED STATES PATENTS

| | | | |
|---|---|---|---|
| 2,773,030 | 12/1956 | Tailleur | 252—8.5 |
| 3,310,125 | 3/1967 | Darley | 252—8.5 X |
| 3,322,668 | 5/1967 | Fontenot et al. | 252—8.5 |
| 3,385,789 | 5/1968 | King | 252—8.5 |
| 2,714,582 | 8/1955 | Day | 252—311.5 |
| 3,360,461 | 12/1967 | Anderson et al. | 252—8.5 |
| 3,481,870 | 12/1969 | Cheng et al. | 252—8.55 X |

HERBERT B. GUYNN, Primary Examiner

U.S. Cl. X.R.

175—65, 72; 252—8.5 P, 311.5, 363.5